United States Patent [19]

Rapaport et al.

[11] 4,101,338

[45] Jul. 18, 1978

[54] PROCESS FOR RECOVERING USEFUL PRODUCTS FROM CARBOHYDRATE-CONTAINING MATERIALS

[75] Inventors: Robert M. Rapaport, New Rochelle; Anthony Monti, Irvington; Raymond D. Moroz, Staten Island, all of N.Y.; Charles B. Broeg, Short Hills, N.J.

[73] Assignee: Sucrest Corporation, New York, N.Y.

[21] Appl. No.: 680,721

[22] Filed: Apr. 27, 1976

Related U.S. Application Data

[63] Continuation-in-part of Ser. No. 582,809, Jun. 2, 1975, abandoned.

[51] Int. Cl.$^2$ .................. C13D 3/14; C13D 3/00; C13D 3/16
[52] U.S. Cl. .................. 127/46 B; 127/48; 127/54; 127/56
[58] Field of Search ............ 127/9, 46 R, 46 A, 46 B, 127/48, 56, 54

[56] References Cited

U.S. PATENT DOCUMENTS

| | | | |
|---|---|---|---|
| 789,478 | 5/1905 | Baldwin | 127/56 |
| 2,626,878 | 1/1953 | Bartz | 127/46 A X |
| 2,868,677 | 1/1959 | Koppe | 127/46 B |
| 2,916,404 | 12/1959 | Battistoni | 127/48 X |
| 2,937,959 | 5/1960 | Reents | 127/46 B |
| 3,314,818 | 4/1967 | Swarthout | 127/48 |
| 3,418,165 | 12/1968 | Rabe | 127/48 |
| 3,479,221 | 11/1969 | Buhl | 127/48 X |
| 3,711,329 | 1/1973 | Zievers | 127/9 |
| 3,799,806 | 3/1974 | Madsen | 127/48 X |

*Primary Examiner*—Sidney Marantz

[57] ABSTRACT

Process for fractionating carbohydrate-containing materials, such as molasses, by contact with an ion exclusion resin wherein a first portion of the material and a second, less dense portion of the material are sequentially fed to the resin. This scheme of adding the carbohydrate-containing material to the column of ion exclusion resin lessens the channeling problem. Also, a process for treating molasses comprising adding ferric ions to the molasses to form a precipitate and passing the so-treated molasses through an ion exclusion resin.

38 Claims, No Drawings

PROCESS FOR RECOVERING USEFUL PRODUCTS FROM CARBOHYDRATE-CONTAINING MATERIALS

This application is a continuation-in-part of Ser. No. 582,809, filed Jun. 2, 1975, now abandoned.

BACKGROUND OF THE INVENTION

This invention relates to the recovery of the carbohydrate fraction, as well as other useful products, from carbohydrate-containing products, particularly molasses.

The art has long been aware that a host of carbohydrate-containing products exist from which can be derived all or part of the desirable carbohydrate content thereof. Products such as fruit juices, cane and beet sugar juices, starch hydrolysates, hardwood sulfite liquors, whey and the like present attractive source materials for carbohydrates such as sucrose fructose, glucose, invert, sugar lactose and xylose. In many cases, however, the low efficiency of prior art separation processes has not justified the expense typically encountered in such methods. Compounding this economic disadvantage has been the inability to obtain additional useful products from these source materials, and hence offset the costs of carbohydrate recovery, without the need for still further extensive separation techniques.

The foregoing problems are particularly acute in the field of sugar refining wherein enormous quantities of "by-products" such as molasses result from the sucrose production process. While molasses is known to contain many useful products, including sucrose, fructose, glucose, invert sugar and inorganic salts, attempts to recover these have been hampered by the inability to achieve any economically significant removal of these valuable products.

The production of sugars such as refined sucrose may begin with either sugar cane or sugar beets as source materials therefor. While processing steps designed to yield substantially pure sucrose differ depending upon the sugar source utilized, a common by-product of these processes is molasses. Molasses may be generated at a number of places in the overall sugar process and is not, therefore, of any absolutely fixed composition. As understood by the art, however, molasses is used generally to define the mother liquor remaining after sucrose has been crystallized out of solution. Molasses will generally contain sucrose, glucose and fructose, inorganic salts, and organic non-sugar compounds. The composition of molasses will depend upon processing conditions, the particular sugar source utilized, and the point in the process from which the molasses is taken off.

While not limited by definition, molasses typically and practically defines a sugar solution wherein, due to the depletion of sucrose, the build-up of non-sucrose solids, and the increased viscosity of the mother liquor, it is no longer possible to crystallize sufficiently pure sucrose therefrom. This type molasses is generally referred to as "final molasses" or "blackstrap molasses." Final molasses has found some useful outlets. For example, it has been utilized as a source of yeast, vinegar and various organic chemicals, such as alcohols, through fermentation. However, technological advances resulting in the more economic synthesis of these products has minimized the importance of molasses as a chemical source. While final molasses is not generally considered suitable for human consumption, molasses generated from earlier stages in the operation of sugar factories (e.g. first and second molasses) have been used for many years as food and as components of bakery and confectionary items. Rarely, however, are molasses used in foods in such quantities as to afford a significant market for the vast quantity of molasses produced in sugar factories.

By far the major use for molasses such as final or blackstrap molases is as a direct feed for ruminant animals and as a raw material for feed compositions. However, in excessive amounts molasses acts as a laxative, thus being a limiting factor for daily consumption.

In some areas of the world molasses has found use as a fertilizer. However, this use of molasses has proven to be economic only in those areas where there is no ready market for molasses.

Molasses from beet sugar processes have long been treated to remove sugars therefrom. The most widely utilized process for desugaring is the Steffen process involving the addition of lime to a dilute molasses solution. While the Steffen process is generally capable of recovering up to 95% of the sugar in beet molasses, it is not generally applicable to the treatment of cane molasses because the process substantially destroys invert sugar. Moreover, the Steffen treatment of beet molasses, resulting as it does in only a single product stream — sugar — fails to fully utilize other valuable components of molasses. Still further, raffinose, which leads to errors in the polarization analysis for sucrose and adversely influences sucrose crystal growth, is built-up to a large extent in the Steffen process. The art has therefore generally resorted to discarding molasses in Steffen factories for 24 hour periods every one or two weeks. This "discard molasses" is yet another source of molasses requiring an economical outlet.

The prior art has also recognized the general utility of applying the principle of ion-exclusion in separating sugars from feedstocks such as molasses. See, for example, U.S. Pat. No. 2,937,959 to Reents, et al., issued May 24, 1960. Difficulties are encountered, however, in treating molasses such as blackstrap wherein the effectiveness of the exclusion resin progressively decreases with time. Moreover, considerable problems arise in attempting to practice these techniques on a commercial scale.

It is accordingly an object of this invention to provide a process useful in the treatment of carbohydrate-containing materials to isolate and remove the carbohydrate fraction thereof as well as to effectively recover and utilize other useful products therefrom.

Another object of this invention is to treat molasses to recover useful products therefrom.

A further object of this invention is to treat molasses, without regard for the source thereof, to obtain a variety of useful products which enhance the complete utilization of molasses.

Yet another object of this invention is to treat molasses to produce a product useful as a sugar source; a product useful as a fertilizer; and a product useful as an animal feedstock.

Still another object of this invention is to produce the above-mentioned products in quantities relative to their economic and practical utilization.

Another object of this invention is to clarify solutions of carbohydrate-containing materials, particularly blackstrap molasses.

These and other objects will become more apparent upon reading the more detailed description which follows.

SUMMARY OF THE INVENTION

The foregoing objects are achieved by a process for treating carbohydrate-containing materials to isolate and remove the carbohydrate fraction therefrom which process comprises passing a solution of the carbohydrate-containing material through an ion-exclusion resin capable of separating the carbohydrate from the inorganic compounds in the source material. Water is thereafter passed through the resin and the resultant effluents may be separated into distinct solutions having salts and carbohydrate as the predominant solids.

In a specific embodiment of this invention, viscosity variations are imposed upon the feed solution to the exclusion resin in order to substantially reduce the incidence of channelling or other flow disturbances within the column. Channelling, literally the establishment and consequent following by the feed material of distinct selected flow paths in a packed column, results in a by-pass of a large portion of the active sites of the exclusion resin and the concomitant decrease in the efficiency and the degree of carbohydrate isolation and separation.

Where it is desired to recover the sucrose fraction from a sucrose-containing source material, it has additionally been discovered that the exclusion resin utilized must not be in the hydrogen form since this will cause inversion of the sucrose to invert sugar.

As previously noted, the present invention has particular applicability to the treatment of molasses to recover useful products therefrom. Molasses, particularly blackstrap molasses, owing to its viscosity and the host of non-sugar impurities contained therein has proven in the past to be only minimally susceptible to typical separatory techniques. Because of this uniquely troublesome nature of molasses, much of the ensuing discussion and description is devoted to the applicability of the present invention thereto. It will be apparent to skilled art workers from the discussion of molasses treatment, as well as from the specific description and examples relating to other carbohydrate-containing solutions, that the present invention is effective in the treatment of a wide range of materials.

In the discussion which follows reference will be made to those molasses treatment techniques which are not necessarily required for certain other carbohydrate-containing materials as well as additional or altered treatment steps necessitated or preferred when processing particular types of carbohydrate containing materials.

In accordance with one aspect of this invention, it has been discovered that the effectiveness of the ion-exclusion resin in separating the molasses into useful components is greatly enhanced by the removal of a significant amount of the organic non-sugar material from the molasses prior to its passage through the exclusion resin. The prior art has heretofore largely relied upon the resin itself to separate out these materials since they are generally of a higher molecular weight than sugar and are therefore excluded from the resin particles. However, we have found that the preliminary efficient removal of such materials is of significant importance in achieving a high degree of separation in the resin bed.

In one embodiment of this invention it has been discovered that the addition of aluminum or ferric ions, preferably in the form of ferric chloride, ferric sulfate or aluminum sulfate, to the source molasses results in a highly effective removal of material in the form of a precipitate which would otherwise hinder the ion-exclusion process.

In another embodiment of this invention it has been found that the particular resin material and the physical characteristics of the resin bed play an important role in achieving effective separation of sugars and salts. Thus, for example, it has been found that typical resins comprised of a sulfonated styrene-divinylbenzene polymerizate having a cross-linkage or percent of divinylbenzene in the sodium form significantly higher than that heretofore utilized, e.g., at least about 4% are particularly useful, and hence preferred, for separating molasses, especially blackstrap molasses. It appears that the added bed strength is an important separation factor for these materials. In general, greater degrees of cross-linking may be successively employed, e.g., up to and including about 8% divinyl benzene. As the degree of cross-linking increases, however, the throughput capacity of feed through the resin decreases.

Moreover, the ratio of the exclusion column height to its diameter, as well as the size of the resin particles and the respective temperatures of the molasses solution and the follow-up water, all affect the effective separation.

In another embodiment of this invention, it has been unexpectedly found that a high degree of preliminary non-sugar removal from particularly low-grade molasses such as blackstrap is not generally achievable utilizing known precipitants, clarificants, and floculants and separation techniques typically employed in clarifying sugar solutions. We have found, however, that subjecting molasses or solutions thereof to centrifugal force achieves an unexpectedly superior removal of non-sugars, including ash. This efficient removal significantly enhances the effectiveness of the subsequent chemical separation of oraganic non-sugars and the exclusion/separation process.

The effluent from the exclusion resin exits therefrom in distinct fractions predominating in one or more useful materials, at least one of which is the carbohydrate contained in the source materials, i.e., sucrose, when molasses is treated. The effluent fractions may therefore be more effectively used for a variety of purposes thereby enhancing the near complete utilization and marketability of the source molasses.

In another embodiment of this invention, membrane filtration, commonly referred to as ultrafiltration, techniques are utilized to remove a significant portion of organic non-carbohydrate compounds, typically color bodies or precursors thereof, from the carbohydrate-containing source material. This clairfication technique may be utilized either prior to exclusion/separation or as a means of further clarifying the carbohydrate-rich fraction obtained from the ion exclusion treatment.

As used herein, the term "molasses" is intended to encompass all forms of the liquor from which sucrose is crystallized or crystallizable. Thus, the term is inclusive of whole juice molasses; "first molasses", i.e., the mother liquor remaining after the first crystallization of sucrose therefrom even though crystallizable sucrose remains in the liquor, and all subsequent liquors remaining after crystallization. The term further includes "final" molasses or that mother liquor which, owing to its viscosity and large concentration of impurities such as ash, non-sucrose sugars, and organic non-sugars, is for all practical and economic purposes no longer capable of yielding sucrose upon crystallization. Moreover, molasses is intended to embrace the above products irrespective of the source of the molasses, i.e., be it from a sugar cane or sugar beet process, or from which point in the process it is generated and taken off. Thus, the term includes first, subsequent and final molasses generated in the crystallization of sucrose in raw cane sugar processing; the molasses recovered in the affination of sucrose crystals containing a thin film of molasses during the refining operation; "refining molasses" produced in the sucrose crystallization process practiced in the cane sugar refining operation; beet molasses from the sucrose crystallization from beet sugar solutions; and "discard" molasses from the Steffen process.

Indeed, as will become apparent, the process of this invention has as one of its significant advantages, its applicability to so wide a range of sugar-containing products. Moreover, other non-molasses carbohydrate-containing products such as whey, starch hydrolysates, fruit juices, sugar containing products such as cane and beet juices, concentrates made therefrom, and the like may be successfully treated in accordance with the process of this invention.

DETAILED DESCRIPTION OF THE INVENTION

As generally applied to the broad class of carbohydrate-containing source materials which may be treated in accordance with the present invention, the process of this invention utilizes the principle of ion exclusion to isolate and remove the carbohydrate fraction from the source material as well as effecting contemporaneous separations of additional useful products.

Ion exclusion is now a fairly well-known process and has been suggested generally for use in the sugar industry. Rather than involving the exchange of ions, the exclusion resins achieve a physical adsorption of one or more components to the exclusion of others. Thus, for example, a cation exchange resin will display a more prominent affinity for a weakly ionizable material (such as sugar) permitting the material to be adsorbed on the resin while more highly ionizable materials such as inorganic salts remain in the surrounding or interstitial fluid. Upon passing water through the resin bed, a solution of the highly ionizable material will appear first, followed eventually by the physically adsorbed weakly ionizable material. The resin so utilized is referred to hereinafter as the ion exclusion resin.

In the application of ion exclusion to carbohydrate-containing source materials, particularly molasses, channelling problems are prevalent which result in very low efficiency separations. These problems, while often encountered in processes involving the flow of a liquid through a packed column, become attenuated in exclusion processes due to the peculiar physical nature of the resin bed and the fact that efficient exclusion requires the throughput of at least two liquid streams — feed material and follow-up liquid such as water. In accordance with this invention, these problems are largely eliminated, and hence exclusion efficiency increased, by using one or more techniques peculiarly applicable to exclusion processing. In one embodiment, channelling or "leap-frogging" as hereinafter described, is materially reduced by introducing the carbohydrate-containing source material into the exclusion column in an incremental manner such that the viscosity of the source liquid may be varied. In particular, using molasses as an example, a typical molasses feed to the exclusion column would have a density in the range of about 45°–55° Brix. It is found that when follow-up water is introduced thereafter to elute the various fractions, the water, being of considerably lower viscosity than the molasses feed, will migrate through the exclusion column at a rate in excess of the rate of molasses throughput. As the water mingles with and eventually by-passes or "leap-frogs" the molasses both the ability of the resin to adsorb carbohydrate and the ability of the water to extract and elute both adsorbed and unadsorbed material are markedly diminished.

The foregoing "leap-frog" condition is extremely pronounced in exclusion columns having low height to diameter ratios, i.e., where the vertical distances between the various fractions are small. In the operation of a commercial scale unit in which maximum throughput is desired, the use of low height to diameter ratios in the order of about 0.8 to about 5.0 is preferred. Hence the foregoing flow problem attenuate on a commercial scale.

It has been discovered that the otherwise attendant leap-frog problem may be significantly reduced or eliminated by utilizing a sequential feed to the exclusion column comprised of at least two fractions of the feed material of differing viscosity. A first fraction consists of the normal feed to the column, e.g. for molasses, a feed at about 45° – 60° Brix. The second sequential feed fraction has a viscosity (i.e., lower Brix value) lower than that of the first fraction. A dilute aqueous medium such as water or a dilute molasses solution is then sequentially added to elute the various product solutions from the exclusion column. The viscosity difference between this eluting medium and that of the second feed fraction, being smaller than would be encountered utilizing a feed of constant viscosity, serves to prevent the eluting medium from by-passing the feed material.

In a most preferred embodiment, three or more distinct fractions are sequentially employed. The first fraction of the molasses feed to the column comprises a low density solution thereof, e.g., from about 15° to about 25° Brix. The next sequential addition comprises molasses having a higher density, typically from about 45° to about 55° Brix. This is then followed by a third feed fraction having a density in the range of about 15° to about 25° Brix. Thus, the typical feed, i.e., 45°–55° Brix molasses is buffered or cushioned with low density molasses.

The follow-up water or other dilute aqueous solution is then fed to the column to elute the various product fractions. This rinse may be accomplished using either water or a dilute solution of no more than about 5° Brix density, or a sequential mixture thereof. It is found that the buffer or cushion zones about the high density molasses feed serve to minimize, and generally eliminate, the tendency of the rinse fraction to mingle with or bypass the molasses. In this manner, suitable residence times are permitted for appropriate adsorption by the exclusion column and sequential elution of the various product streams.

The amounts of the various components of the feed material necessary to provide a suitable buffer zone around the high density molasses feed may vary considerably based upon the design of the column, the density of the buffer layers and feed and other like considerations. In general, however, the amounts (measured as bed volumes) of each buffer should be approximately the same as the high-density molasses feed, and typically from about 0.8 to about 2.5 times the amount of the high-density fraction.

As will be apparent to those skilled in the art, relative densities, viscosities or concentrations are directly interrelated and may be looked upon as alternative means for expressing viscosity or flowability differences between the various fractions. Thus, while Brix is a density measurement, it will be understood that, for example, higher values connote solutions of higher viscosity (and concentration).

An additional method which may be utilized either alone or, preferably, in conjunction with the foregoing viscosity-variation method is to pass the water or other dilute solution used to wash the various materials from the column, i.e., the follow-up water, through the bed at a temperature below that at which the source material was fed. Preferably, this temperature differential should be in the order of at least about 20° measured on a Farenheit scale. In a particularly preferred embodiment, where the earlier-described feed density variations are utilized, the temperature of the low-density buffer components of the feed are maintained at temperatures lower than that of the high-density feed fraction. This mode of operation minimizes both the mingling of the interfaces of the feed components and the tendency of the rinse fractions to bypass the feed fractions.

To a considerable extent, the efficiency of the ion exclusion separation is dependent, for some carbohydrate-containing source materials such as molasses, upon the effective pre-treatment thereof to remove organic non-carbohydrate compounds. The necessity or desirablity of such pre-treatment and the extent thereof will vary according to the source material. Since molasses poses the most significant problems in this respect owing to its large amount of organic non-sugars, typically color compounds or their precursors, the following discussion relates to specific preferred embodiments having applicability to molasses. As earlier noted, while it is not absolutely essential to pre-treat molasses, it is nonetheless preferable to do so.

In accordance with one embodiment of this invention, molasses is first treated to remove organic non-sugar materials in the form of a precipitate. The precipitate is removed by appropriate means to leave a clarified molasses solution largely devoid of the colors caused by the presence of these organic materials.

In a preferred embodiment of this invention, an iron-containing compound, preferably $FeCl_3$ or $Fe_2(SO_4)_3$ is added to a molasses solution. These ferric salts, along with other like materials, form complexes with impurities in the molasses solution with the result that a floc is formed capable of settling to the bottom of an appropriate vessel and carrying therewith a large portion of the organic non-sugar impurities.

The degree of floc formation and organic non-sugar/color removal is primarily a function of the solution pH and its solids concentraton. Using iron-containing compounds as an example, and a feed material of final cane molasses (blackstrap molasses), flocculation/precipitation is noted over a wide range of pH on the order of about 2.0 to 9.0, precipitation and removal from the molasses solution being acheived to varying degrees within this range. The most efficient precipitation and color removal and the most desirable color in the remaining supernatent molasses solution is achieved over a preferred range of about pH 2.0 to 3.0 and most preferably a pH of about 2.1 to less than 2.5. Since most molasses have an initial pH of about 5.5 to about 9.0, some degree of pH adjustment prior to adition of the floculant will be necessitated in most cases. Any suitable acidic material such as hydrochloric acid may be used to obtain the desired pH.

Where iron-containing compounds are employed as the precipitating additive, it has been determined that the molasses solution should be of a relatively dilute concentration to enhance floc formation. The molasses solution is preferably below about 30% solids by weight and most preferably from about 5% to 25% solids by weight. Excellent color removal has been accomplished using a 10% solids solution and either ferric chloride or ferric sulfate.

The temperature of the molasses during this clarification with ferric ions is not believed to be of critical importance but is subject to considerations of the viscosity of the molasses and the consequent ease of precipitation or organic non-sugars. Preferred temperatures are in the range of about 60° F. to about 180° F., and most preferably, particularly for basic solutions, from about 160° F. to 180° F. For acidic solutions, a preferred temperature range is from about 60° F. to 120° F. The amount of precipitating additive utilized may vary over a wide range, depending largely upon the additive utilization, the solids concentration of the molasses to be treated, and the amount of organic impurities contained therein. Amounts of ferric compounds from 1 to 25% by weight of the solids have been employed and preferred ranges vary from about 3% or greater, most preferably 6–15% for $FeCl_3$ and about 22% for $Fe_2(SO_4)_3$. In general it appears that the color of the supernatent molasses solution improves with increasing amounts of additive.

The precipitate formed in the above-described step may be removed by any number of means, depending to some degree upon the additive used and the type precipitate formed. Procedures such as filtering have been successfully utilized. In our preferred embodiment wherein iron-containing compounds are used as the precipitant, a preferred process after removal of the above-described precipitate, involves thereafter raising the pH to above 7.0 to precipitate iron compounds. Calcium oxide or hydroxide is exemplary of the materials useful for this purpose. Indeed, the foregoing procedure has been found to yield a further precipitate resulting in additional color removal. An optimum range of pH is from about 7.5 to 8.6 and preferably about 8.1. Any iron remaining in solution may be removed by the addition of suitable materials such as inorganic phosphates, preferably sodium or calcium phosphates. A preferred material is monocalcium phosphate. The amount of these materials needed to effect substantial iron removal may vary widely and is easily determinable by those skilled in the art. For example, amounts from 2% to 6% of monocalcium phosphate by weight of the solids in solution in a slightly basic medium afford near commmplete iron removal.

Owing to the desirability of using molasses solutions of relatively low solids concentrations in this precipitation step, subsequent concentration, e.g. by evaporation, may be practiced to achieve a higher solids content. Evaporation to about 60° Brix may result in the formation of a further precipitate which may be removed in any conventional manner. Further concentration, if desired, may then be resumed.

It is generally desired to remove 90% or more of the color from the molasses solution and the above-described materials and conditions may be varied to achieve even greater color removal, i.e., up to about 93% removal.

In an alternative embodiment of this invention, having particular applicability to final molasses, especially blackstrap molasses, it has been discovered that subjecting the molasses to centrifugal force preferably followed by filtration achieves an unexpectedly efficient removal of the non-sugar material contained therein such as ash and color bodies, even in the absence of chemical precipitating, clarifying, or flocculating agents although it is preferred to utilize such clarification techniques in combination. Moreover, blackstrap molasses having a density of greater than about 70° Brix may be successfully treated in accordance with this method. Where such high density molasses is utilized as the source molasses, it is generally necessary to heat the molasses to an elevated temperature, for example, in the range of from about 140° F to about 180° F prior to centrifugation. In general, molasses having densities below about 45° Brix need not be heated this high.

Centrifugation further achieves superior separation to conventional precipitation techniques employing additives such as lime, lime and carbon dioxide, lime and sulfur dioxide, and phosphoric acid followed by filtration. Indeed, such techniques have proven largely unsuccessful even for low density blackstrap molasses.

In certain cases it has been found that the addition of a polyelectrolyte enhances this preliminary centrifugal separation. Such materials are well known in the art, such as one sold under the trade designation "Separan."

The amount of centrifugal force required for efficient separation is easily determinable and may, for example range from about 6,000 to about 15,000 G's, preferably from about 8,000 to about 11,000 G's.

The thus clarified molasses solution is then subjected to an ion exclusion resin wherein the principle of ion exclusion is utilized to separate the molasses solution into desired end products. The earlier-described modes of operating the exclusive column to prevent channelling or other flow disturbances may be utilized depending upon the needs of the particular systems. In general, such techniques are required where large density or viscosity differences exist between the feed material and the eluting medium.

In accordance with this invention, the effluent molasses resulting from the preliminary removal process above-described, is passed through an ion exclusion resin. The preliminary removal step is of importance since the presence of any significant amount of material capable of precipitation has been found to cause the ion exclusion resin to become coated with the precipitate and substantially diminish its effectiveness for preferential physical adsorption. Hence, care should be taken to insure the substantial absence of such impurities. If not removed in the clarification step, a suitable subsequent removal should be effected.

The ion exclusion resin may be of the cation or anion type, although a cation resin is preferred.

In accordance with one embodiment of this invention it has been found that the composition of the resin as well as the physical characteristics of the bed and process conditions are important factors bearing upon the efficient separation of the molasses. Thus, we have found that a cation exchange resin comprised of a sulfonated styrenedivinylbenzene polymerizate having a cross-linkage or percent of divinylbenzene in the sodium form of about 8% is preferred in separating molasses, especially blackstrap molasses. This degree of cross-linkage, generally higher than suggested in the art, imparts desirable strength to the resin. Such a resin as above-described is commercially available as Dowex 50 WX8 (trade designation of the Dow Chemical Company). Another appropriate exclusion resin is sold under the trade designation Amberlite IR-120. Resins having a percent cross-linkage of 4–8% have also been successfully utilized in the treatment of molasses and other carbohydrate-containing products. Generally, cross-linking above about 8% will too greatly reduce throughput capacity to be effectively utilized on a commercial scale.

We have also found that the height to diameter ratio of vertical cylindrical columns used for contacting the resin will affect the quality and efficiency of the exclusion. For resin bead particle sizes of 20–50 mesh (U.s. Sieve) the height to diameter should be at least about 1 and preferably from about 3 to 50. For mesh sizes of 50 to 80, suitable ratios may range from about 1 to about 20.

In passing the molasses through the ion exclusion bed the flow rate should be controlled so as to result in the optimum separation. Since this separation is a result of physical adsorption, the flow rate should not, therefore, exceed the adsorption rate of sugar onto the resin. For the above-mentioned cation exclusion resins, the flow rate should preferably be below about 0.60 gal/ft$^2$/min.

The passage of molasses through the exclusion resin is followed by the passage of water through the bed. The relative ratio of follow-up water to molasses may be varied over a wide range and optimums are easily ascertainable with reference to the degree of removal of the adsorbed component from the resin and the concentration of the effluent streams. Preferably, the volume of follow-up water should be at least about twice that of the molasses, and typically from 2 to 3 times the molasses volume.

If passed directly to a cation ion exclusion resin in the monovalent form, it is found that the separation of the molasses feed may become less effective with time due, it is theorized, to the exchange of calcium or other multivalent materials for monovalent ions in the ion exclusion resin. Once calcium and the like appear at the exchange position, the composition of the resin is altered and the resin loses its effectiveness for preferential absorption. Accordingly, the molasses may be first passed through an ion exchange softening column wherein calcium and other like multivalent ions are exchanged for monovalent ions such as sodium. For a cation exclusion resin, a preferred preliminary exchange bed is Amberlite IR-120 utilizing a molasses feed at 180° F and 60° Brix or less. The exchange phenomenon observed may be similar to that described in U.S. Pat. No. 2,937,959 to Reents, et al, issued May 24, 1960. To effect ion exchange, flow rates that are higher than those employed in the ion exclusion step may be used, for example, flow rates of about 1 to 2 gal/ft$^2$/min or even higher may be utilized.

For cation exclusion beds, the sugars in the molasses solution, e.g. sucrose, fructose and glucose, are adsorbed by the resin while the highly ionizable salts are excluded and remain in the interstitiial areas. Moreover, some extremely large (high molecular weight) color bodies, while organic and therefore non-ionizable, are too large to be adsorbed in the resin and hence remain in the surrounding liquid.

Upon the passage of water through the exclusion bed, a variety of effluents will appear which can be divided according to the composition and their elution time. Typically, the first appearing effluent fraction will be a solution having less than about 1% sugar by weight and whose solids are largely or predominantly ash (typically inorganic salts). Color bodies excluded by the resin due to their size will also appear in this fraction. This fraction, while useful as a regenerant for the softening resin, may be evaporated to form a concentrated salt mixture finding use as a fertilizer. Additionally, potassium salts may be crystallized out of the solution. The second effluent fraction is typically a diluted solution of the feed molasses. This fraction may be recycled for further separation. However, upon evaporation, the fraction, being similar to molasses in composition, is useful as a ruminant feedstock. Since it is produced in only fractional quantities its utilization for this purpose is not unduly restricted by the intake limitations to which reference was earlier made.

A third effluent fraction is a solution containing a large amount of sugar and extremely small quantities of ash and organic non-sugars. This fraction may be evaporated to yield a useful sugar solution. Removal of some residual color may be necessary in the treatment of this fraction.

A fourth fraction is a highly diluted sugar solution ideally suited for diluting source molasses where the preliminary precipitation or ion exclusion so require. A final fraction is essentially colored water having little practical value.

In an alternate embodiment of this invention, a non-softened molasses solution may be passed through an exclusion resin which is in the divalent form to achieve separation. In this embodiment, the molasses is first mixed with a polar organic solvent such as ethanol. After removal of a resultant precipitate, the supernatent molasses solution is passed directly to an exclusion resin in the calcium form. In general, the effluent fractions from this exclusion are a first fraction comprised largely of mineral salts and trace amounts of sugar. A second effluent fraction is largerly sugar and color bodies and has a low ash content. A third fraction is essentially dilute alcohol.

In another embodiment of this invention, the ion exclusion step may be preceeded by subjecting the molasses solution to a membrane filtration step to remove the above-mentioned higher molecular weight color bodies. In this manner, the effluents from the ion exclusion column are relatively free of such color bodies and therefore more immediately usable for their intended purpose. A membrane of cellulose acetate may be used for this purpose. Ultrafiltration techniques such as this typically require relatively dilute solutions, for example, less than about 40° Brix, preferably below about 15° Brix. Conventional reverse osmosis units may be employed, with the proviso that the membrane be chosen to provide sufficient permeability to allow the passage of at least one of the solid materials. Water may be employed to flush the system.

The ultrafiltration, while desirably employed prior to the ion exclusion treatment, may additionally be utilized to clarify the carbohydrate fraction emmanating from the exclusion column.

In accordance with the foregoing procedures, an effluent stream of concentrated mineral salts, most notably potassium, is recovered and is ideally suited for use as a fertilizer. A substantially pure sugar containing stream is recovered having to a substantial degree, where blackstrap molasses is used as the feed, the characteristics, properties and utilities of invert sugars. Mixed compositions of salts and sugars, being thereby akin to normal molasses, can find direct use as an animal feedstock. Advantageously, the beginning molasses is separated into product materials which can be used to their fullest extent based upon the current relative demands therefor with almost negligible waste.

EXAMPLE I

Blackstrap molasses from a cane sugar process was utilized in this run. The blackstrap was diluted to 10° Brix and 12% by weight (solids basis) $FeCl_3$ was added at a pH of 2.5. The mixture was heated to 160° F and filtered. The pH of the supernatant was raised to 8.6 using 4% calcium oxide, heated to 160° F and filtered. The solution was then brought to a pH of 4.7 using $H_3PO_4$ and filtered. 5% by weight disodium acid pyrophosphate was then added, the mixture allowed to sit a 160° F for 5 minutes and then filtered. The supernatant was then treated with 5% KB carbon at 160° F for 5 minutes and filtered.

The above procedure resulted in 97.3% color removal from the feed molasses.

EXAMPLE II

Blackstrap molasses was diluted to 10° Brix to which was added 18% $FeCl_3$ by weight (solid basis). The solution was heated to 160° F, filtered and then adjusted to 8.1 pH with calcium oxide and re-filtered. 90% color removal was achieved.

EXAMPLE III 2032 grams of blackstrap at 10.5° Brix is heated to 160° F. and 11% by weight (solids) (23.43 grams) of $Fe_2(SO_4)_3$ is added. One gram (0.47%) of calcium oxide is added followed by 11% $Fe_2(SO_3)_4$. The solution is then adjusted to pH 2.5 with calcium oxide. The solution is then centrifuged. The resultant supernatant is heated to 140° F and raised to pH 8.1 with calcium oxide. This is followed by centrifuging and addition to the remaining solution of 2% monocalcium phosphate. The pH is adjusted to 8.0 and the mixture is centrifuged. Color removal was approximately 90%.

EXAMPLE IV 250 ml. of blackstrap molasses was diluted to about 45° Brix and heated to 180° F. The molasses was centrifuged and the effluent therefrom filtered through filter paper in a Buchner funnel. Filtration was rapid and highly effective.

Filtration of the same molasses solution in the absence of the centrifugation resulted in only 5 mls. of filtrate being collected before filtration ceased. Similarly, the use of lime in amounts resulting in pH values of 6.0, 6.5, 7.0 and 8.0 resulted in no filtrate being obtained. Similar unsatisfactory results were obtained using phosphoric acid. Where centrifugation was employed, however, the supernatant liquid therefrom filtered rapidly.

EXAMPLE V 200 mls. of blackstrap molasses (79.5° Brix) was heated to 180° F and centrifuged at about 11,000 G's. An effluent of improved clarity and reduced viscosity was recovered and found to have an ash content of almost 30% by weight less than the original blackstrap.

EXAMPLE VI

A centrifuged and filtered molasses solution was analyzed as follows: (weight percent; dry basis)

| | |
|---|---|
| Sucrose | 49.7 |
| Invert Sugar | 24.0 |
| Ash | 10.0 |
| Organic non-sugars | 16.3 |
| pH | 5.1 |

This solution was then passed through an ion exclusion resin in a series of runs, the results of which are summarized in Table I. In all runs, the flow rate for the molasses and water was 0.40 gallons/ft$^2$/minute. Fraction 1 was a high ash colored liquid containing less than 1% sugar by weight; Fraction 2 was a dilute solution approximating the dry basis composition of the feed; Fraction 3 contained a large amount of sugar and minimal ash and organic non-sugars; Fraction 4 was a dilute sugar solution; and Fraction 5 was waste water. The relative proportions of feed and effluent fractions are given in terms of bed volumes (B.V.). In all cases, the molasses was fed at 180° F. followed by water at 160° F.

TABLE I

| RUN NO. | RESIN | H/D | FEED DENSITY | INLET (B.V.) FEED | INLET (B.V.) WATER | EFFLUENT (B.V.) 1 | 2 | 3 | 4 | 5 | FRACTION 3 ASH | FRACTION 3 BRIX |
|---|---|---|---|---|---|---|---|---|---|---|---|---|
| 1** | Amberlite IR-120 | 50 | 45° Brix | .20 | .60 | .04 | .70 | .08 | .10 | .20 | 1.5% | 8.0 |
| 2* | " | 12 | 45° Brix | .35 | .80 | .08 | .65 | .04 | .25 | .08 | 3.3% | 6.0 |
| 3 | Dowex 50 WX8 (50 80 mesh) | 14 | 35° Brix | .28 | .64 | .08 | .53 | .08 | .03 | .37 | 0.6% | 7.0 |

*Feed molasses was centrifuged only.
**The volume of effluent may exceed the total volume of feed because of initial displacement of water already present in the resin.

EXAMPLE VII

Blackstrap molasses was diluted to 45° Brix, heated to 180° F. centrifuged and filtered. At 180° F. and 45° Brix, the blackstrap was softened by passing it through a column containing cation exchange resin Amberlite IR-120 in the sodium form at a rate of about 20-25 cc/min. The column was 5.1 cm in diameter and approximately 800 cc of resin were used. The effluent therefrom was then passed through a 2.5 cm by 215 cm column of ion exclusion resin designated by trade name as Dowex 50 WX8 at a rate of about 20-25 cc/min. followed by water at a similar rate, the water to molasses feed being about 2.7:1 by volume. Volume percentages of the effluents were as follows:

| | | |
|---|---|---|
| First fraction | (predominantly salts) | = 6% |
| Second fraction | (mixture of salts/sugars) | = 45% |
| Third fraction | (predominantly sugars) | = 49% |

The third fraction was then passed through a column of granular carbon (designated as Pittsburgh-Activated=Type Cane-Cal) and the effluent therefrom passed through a decolorizing resin column containing Amberlite IRA 401 S. The effluent was filtered and evaporated to about 67°-68° Brix. Based upon the original feed, color removal in the third fraction was 90% and ash removal 80%.

EXAMPLE VIII

The clarified molasses of Example III is passed through a reverse osmosis unit to raise the Brix to about 17 and then is passed through a granular carbon bed. The solution is concentrated by evaporation to about 50° Brix and centrifuged. The remaining solution is then treated in accordance with Example VII.

EXAMPLE IX

Approximately 500 cc of blackstrap molasses was diluted to 50° Brix and filtered. The filtrate was mixed with an equal volume of ethanol (a polar organic solvent) and allowed to stand for a short time. Approximately 50 cc of dark viscous sludge settled out and was separated from the supernatant liquid.

The supernatant liquor was passed over Dowex 50W8 resin in the calcium form in a 5.1 centimeter diameter column containing 1160 cc of resin. The molasses was passed over the resin at the rate of 20 to 22 cc per minute at a temperature of 180° F.

The resin, after being saturated with approximately 450 cc of the molasses product, was eluted with water with the following results: — the first material eluted from the column was a product consisting of high mineral content and trace amounts of sugar; — this was followed by a second fraction containing a high sugar and low mineral content and which was highly colored; and — a third fraction substantially of the same composition of the feed molasses but highly diluted.

EXAMPLE X 150 pounds of blackstrap molasses was diluted to 50° Brix with 75 pounds of water. The pH was lowered to about 2.5 by the addition of 13% (by weight of solids) of a 50% solution of ferric sulfate. This mixture was then diluted to 16° Brix and allowed to stand overnight after which the clear supernatant was decanted from the precipitate. The supernatant was then heated to about 160° F and passed through a 10 foot cylindrical column having a diameter of 1.0 foot containing 170 pounds of activated granular carbon (occupying 70% of the column volume) at a rate of 25 gallons per hour.

To the thus treated product was then added 4% (by solids weight) disodium pyrophosphate, heated to 150° F and allowed to stand overnight. A precipitate occupying approximately 17% by volume was formed. The supernatant was removed and found to contain 29 color units per milliliter at 5000 Å. The original blackstrap, by comparison, contained 250 color units/ml.

EXAMPLE XI

Apple juice at 180° F. having a pH of 3.9, a density of 11.5° Brix, and a resistivity of 450 ohms was percolated through a 5.1 centimeter diameter column containing 1160 cc of Amberlite XE-200 resin in the sodium form. The flow rate was maintained between 20 to 22 cc per minute.

| | |
|---|---|
| Input Volumes: | |
| Apple Juice Feed | 0.39 Bed Volumes |
| Water Rinse | 0.60 Bed Volumes |
| Output Fractions and Volumes: | |
| First Fraction - Waste | 0.15 Bed Volumes |
| Second Fraction - Recycle | 0.31 Bed Volumes |
| Third Fraction - Product | 0.22 Bed Volumes |

| | |
|---|---|
| -continued | |
| Fourth Fraction - Diluted Product | 0.31 Bed Volumes |

The third fraction, product, having a Brix refractometer reading of 7 and a resistivity greater than 1500 ohms was passed through a granular carbon bed at 180° F. The effluent from the carbon unit was cooled to 110° F. and passed through a deionization resin column containing three parts of a strong anion resin (Amberlite IRA-401) in the hydroxide form and two parts of a strong cation resin (Amberlite IR-120) in the hydrogen form. The effluent was evaporated to 75° Brix. The resulting carbohydrate solution was colorless with an inorganic salt content of less than 0.01%.

The first fraction containing inorganic salts and color constituents was discarded. The second fraction was used for feed in the subsequent ion exclusion cycle, its content being the same as the feed but with slightly more water. The fourth fraction was product but highly diluted and it was evaporated to 15° Brix and added to the recycle.

EXAMPLE XII

Prune Juice at 180° F. having a pH of 3.8, a density of 18.2° Brix, and a resistivity of 185 ohms was percolated through a 5.1 centimeter diameter column containing 1160 cc of Amberlite XE-200 resin in the sodium form. The flow rate was maintained between 20 to 22 cc per minute.

| Input Volumes: | |
|---|---|
| Prune Juice Feed | 0.39 Bed Volumes |
| Water Rinse | 0.60 Bed Volumes |
| Output Fractions and Volumes: | |
| First Fraction - Waste | 0.10 Bed Volumes |
| Second Fraction - Recycle | 0.58 Bed Volumes |
| Third Fraction - Product | 0.22 Bed Volumes |
| Fourth Fraction - Diluted Product | 0.09 Bed Volumes |

The third fraction, product, had a Brix refractometer reading of 7.7, with a light tan color and a resistivity of 1400 ohms.

The 1st, 2nd, and 3rd fractions were tested similarly as in Example XI.

EXAMPLE XIII

A whey solution having a Brix refractometer reading of 17.2, a resistivity of 38 ohms and a pH of 5.1 was deproteinated by adjusting its pH to 2.4 with hydrochloric acid and heating to 180° F. The material was centrifuged at 2000 rpm for 5 minutes and filtered.

The deproteinated solution at 180° F. was percolated through a 5.1 centimeter column containing 1160 cc of Amberlite XE-200 in the sodium form. The flow rate was maintained between 20 to 22 cc per minute.

| Input Volumes: | |
|---|---|
| Deproteinated liquor feed | 0.39 Bed Volumes |
| Water Rinse | 0.60 Bed Volumes |
| Output Fractions and Volumes | |
| First Fraction - Waste | 0.09 Bed Volumes |
| Second Fraction - Recycle | 0.35 Bed Volumes |
| Third Fraction - Product | 0.35 Bed Volumes |
| Fourth Fraction - Diluted Product | 0.20 Bed Volumes |

The third fraction had Brix refractometer reading of 5.6, a resistivity of 150 ohms and a lactose content of 5%.

The 1st, 2nd, and 3rd fractions were treated similarly as in Example XI.

EXAMPLE XIV

Clarified blackstrap molasses (clarified with ferric sulfate) at 8.4° Brix and a resistivity of 99 ohms was passed through a 5.1 centimeter diameter column containing 1160 cc of Amberlite XE-200 in the sodium form. The temperature was 180° F. and the flow rate was maintained between 20 to 22 cc per minute.

| Input Volumes: | |
|---|---|
| Molasses Feed | 1.29 Bed Volumes |
| Water Rinse | 0.60 Bed Volumes |
| Output Fractions and Volumes: | |
| First Fraction - Waste | 0.13 Bed Volumes |
| Second Fraction - Recycle | 1.16 Bed Volumes |
| Third Fraction - Product | 0.25 Bed Volumes |
| Fourth Fraction - Diluted Product | 0.35 Bed Volumes |

The third fraction, based on the original feed, represented 96% color removal and 88% ash removal.

EXAMPLE XV

Hardwood sulfite Liquor at 14.9° Brix and a resistivity of 34 ohms was passed through a 5.1 centimeter diameter column containing 1160 cc of Amberliter XE-200 in the sodium form. The temperature was 180° F. and the flow rate was maintained between 20 to 22 cc per minute.

| Input Volumes: | |
|---|---|
| Sulfite Liquor Feed | 0.39 Bed Volumes |
| Water Rinse | 0.60 Bed Volumes |
| Output Fractions and Volumes: | |
| First Fraction - Waste | 0.05 Bed Volumes |
| Second Fraction - Recycle | 0.50 Bed Volumes |
| Third Fraction - Product | 0.14 Bed Volumes |
| Fourth Fraction - Diluted Product | 0.30 Bed Volumes |

The third fraction was rich in xylose. Both the inorganic matter and ligninsulfonates were found in low concentrations relative to xylose.

EXAMPLE XVI

Centrifuged and filtered blackstrap molasses at 40° Brix and 180° F. was percolated through a 5.1 cm diameter column containing 1160 cc of Amberlite IR-118 in the ammonium form. The flow rate was maintained at 20 to 22 cc per minute.

| Input Volumes: | |
|---|---|
| molasses Feed | 0.30 Bed Volumes |
| Water Rinse | 0.60 Bed Volumes |
| Output Fractions and Volumes: | |
| First Fraction - Waste | 0.08 Bed Volumes |
| Second Fraction - Recycle | 0.50 Bed Volumes |
| Third Fraction - Product | 0.08 Bed Volumes |
| Fourth Fraction - Diluted Product | 0.24 Bed Volumes |

The third fraction, product, had a Brix of 7 and an ash content of 3.0% on dry basis.

EXAMPLE XVII

Centrifuged and filtered blackstrap molasses at 40° Brix and 180° F. was percolated through a 6 inch diameter column containing approximately 1.4 cubic feet of Amberlite IR-118 resin in the sodium form. The flow rate was maintained at 0.1 gallon per minute.

| Input Volumes: | |
|---|---|
| Molasses Feed | 0.14 Bed Volumes |
| Water Rinse | 0.41 Bed Volumes |
| Output Fractions and Volumes: | |
| First Fraction - Waste | 0.04 Bed Volumes |
| Second Fraction - Recycle | 0.32 Bed Volumes |
| Third Fraction - Product | 0.14 Bed Volumes |
| Fourth Fraction - Diluted Product | 0.05 Bed Volumes |

Third fraction which was product had the following composition:

| Brix Refractometer | 9 |
|---|---|
| Total Sugars (db)* | 89.3% |
| Ash (db) | 1.2% |
| Organic Non Sugars (db) | 9.5% |
| Color | 30,000 mau |

*db — dry basis

EXAMPLE XVIII

Centrifuged and filtered blackstrap molasses at 32° Brix and 180° F. was percolated through a 6 inch dimater column containing approximately 1.4 cubic feet of Amberlite XE-200 resin in the sodium form. The flow rate was maintained at 0.1 gallons per minute.

| Input Volumes: | |
|---|---|
| Molasses Feed | 0.36 Bed Volumes |
| Water Rinse | 0.55 Bed Volumes |
| Output Fractions and Volumes: | |
| First Fraction - Waste | 0.04 Bed Volumes |
| Second Fraction - Recycle | 0.63 Bed Volumes |
| Third Fraction - Product | 0.12 Bed Volumes |
| Fourth Fraction - Diluted Product | 0.12 Bed Volumes |

EXAMPLE XIX 150 lbs. of blackstrap molasses was treated with 9.75 lbs of ferric sulfate at 17° Brix and 3.2 pH. The mixture, at 80° F., was allowed to stand 24 hours after which the supernatant liquid was drawn off and used as feed to an ion exclusion column. The ash content of the feed solution was 11.8% on dry basis. This solution was passed through a 5.1 centimeter diameter column containing 1160 cc of Amberlite XE-200 in the ammonium form. The temperature was 80° F. and the flow rate was maintained between 20 to 22 cc per minute.

| Input Volumes: | |
|---|---|
| Molasses Feed | 0.39 Bed Volumes |
| Water Rinse Feed | 0.60 Bed Volumes |
| Output Fractions and Volumes: | |
| First Fraction - Waste | 0.13 Bed Volumes |
| Second Fraction - Recycle | 0.45 Bed Volumes |
| Third Fraction - Product | 0.22 Bed Volumes |
| Fourth Fraction - Diluted Product | 0.19 Bed Volumes |

Based on the original feed, color removal in the third fraction was 95%; ash removal 85%.

EXAMPLE XX

Corn molasses at 180° F. was percolated through a 5.1 centimeter diameter column containing 990 cc of Amberlite IR-118 resin in the sodium form. The flow rate was maintained between 20 to 22 cc per minute.

| Feed Characteristics of Corn Molasses | |
|---|---|
| Brix Refractometer | 39.2 |
| Resistivity | 438 ohms |
| pH | 4.7 |
| Input Volumes | |
| Corn Molasses Feed | 0.45 Bed Volumes |
| Water Rinse | 0.70 Bed Volumes |
| Output Fractions & Volumes | |
| First Fraction - Waste | 0.14 Bed Volumes |
| Second Fraction - Recycle | 0.51 Bed Volumes |
| Third Fraction - Product | 0.30 Bed Volumes |
| Fourth Fraction - diluted Product | 0.20 Bed Volumes |

The third fraction, product had a Brix refractometer reading of 22.4 and a resistivity of 2500 ohms and a D.E. of 85.

EXAMPLE XXI

An exclusion column having a diameter of 2 feet and containing 8 cubic feet of Amberlite XE-200 resin is fed material in the following sequential manner (flow rate of 0.5 gal/ft.$^3$/min.:

| Molasses (15° Brix) | 0.11 Bed Volumes |
|---|---|
| Molasses (50° Brix) | 0.055 Bed Volumes |
| Molasses (15° Brix) | 0.055 Bed Volumes |
| Water | 0.17 Bed Volumes |

The following effluents were sequentially obtained:

| Waste | 0.20 Bed Volumes |
|---|---|
| Recycle | 0.25 Bed Volumes |
| Product | 0.09 Bed Volumes |
| Diluent | 0.05 Bed Volumes |

EXAMPLE XXII

Blackstrap molasses at 10° Brix was passed through a number of cellulose acetate membranes manufactured by De Danske Sukkerfabrikker. The following results were obtained:

| Membrane (Manufacturers designation) | ° Brix (effluent) | Flow rate cc's/hr | Color removed % |
|---|---|---|---|
| 865 | 3.02 | 430 | 95.6 |
| 800 | 6.28 | 1350 | 86.4 |
| 600 | 6.83 | 1890 | 83.2 |
| 500 | 7.98 | 2280 | 48.0 |

EXAMPLE XXIII

Fifty gallons of blackstrap molasses (55° Brix) was heated to 180° F and centrifuged at 6000 G's. Color measurement of the resulting effluent indicated the removal of 30% of the color content of the feed material.

While the present invention has been described with respect to specific preferred embodiments and illustrations thereof, they are not intended to be limiting. Obvious and apparent modifications may be made without departing from the scope and spirit of the present invention as defined by the appended claims.

What is claimed is:

1. In a method for treating carbohydrate-containing materials to separate carbohydrate therefrom, wherein said material is flowed through and contacted with an ion exclusion resin, the improvement comprising the steps of:

a. contacting said resin with a first portion of said carbohydrate-containing material;

b. thereafter sequentially contacting said resin with a second portion of said carbohydrate-containing material, said second portion having a density lower than that of said first portion;

c. thereafter sequentially contacting said resin with dilute aqueous medium capable of eluting material adsorbed by said resin; and d. collecting from said resin an eluted solution, the solids of which are comprised predominantly of carbohydrate.

2. The method of claim 1 wherein the density of said second portion is at least about one-half that of said first portion.

3. The method of claim 1 wherein said carbohydrate-containing material is molasses.

4. The method of claim 3 wherein said first portion has a density of from about 45° to about 55° Brix and wherein said second portion has a density of from about 10° to about 25° Brix.

5. A process according to claim 3 wherein said molasses is first pre-treated prior to contact with said resin by adding to molasses a polyelectrolyte and subjecting the resulting molasses to centrifugal force sufficient to effect the separation of solid matter therefrom.

6. The process of claim 5 wherein the molasses subjected to centrifugal force is at an elevated temperature.

7. The process of claim 5 wherein said molasses is blackstrap molasses.

8. The process of claim 5 wherein the density of said molasses subjected to centrifugal force is above about 40° Brix.

9. The process of claim 8 wherein the density of said molasses subjected to centrifugal force is above about 70° Brix.

10. In a method for treating carbohydrate-containing material to separate carbohydrate therefrom wherein said material is flowed through and contacted with an ion exclusion resin, the improvement comprising the steps of:

a. contacting said resin with a first portion of said carbohydrate-containing material;

b. thereafter sequentially contacting said resin with a second portion of said carbohydrate-containing material said second portion having a density greater than that of said first portion;

c. thereafter sequentially contacting said resin with a third portion of said carbohydrate-containing material, said third portion having a density lower than that of said second portion;

d. thereafter sequentially contacting said resin with a dilute aqueous medium capable of eluting material adsorbed by said resin; and e. collecting from said resin an eluted solution, the solids of which are comprised predominantly of carbohydrate.

11. The method of claim 10 wherein said carbohydrate-containing material is molasses.

12. The method of claim 11 wherein the density of said second portion is in the range of about 45° to about 60° Brix.

13. The method of claim 12 wherein the density of said first and third portions is in the range of about 10° to about 25° Brix.

14. The method of claim 13 wherein said dilute aqueous medium comprises water.

15. The method of claim 10 wherein said exclusion resin comprises a sulfonated styrene-divinylbenzene polymerizate in the sodium form.

16. The method of claim 10 wherein said exclusion resin through which said carbonhydrate-containing material is flowed comprises a packed column of said resin having a height to diameter ratio of less than about 5:1.

17. The method of claim 10 wherein the temperature of said first and third portions is less than that of said second portion.

18. The method of claim 17 wherein the temperature of said second portion is at least about 20° F. higher than said first and third portions.

19. A process for treating molasses to recover useful products therefrom, comprising the steps of:

a. adding ferric ions to a molasses solution and removing the precipitate formed thereby;

b. passing the thus treated molasses solution through an ion exclusion resin material capable of preferentially adsorbing sugar from the solution;

c. thereafter passing water through said resin; and d. separating the resulting effluent into a first fraction comprised largely of salts; a second fraction comprised of a mixture of salts and sugars; and a third fraction comprised largely of sugars.

20. The process of claim 19 wherein the molasses solution to which ferric ions are added has a solids concentration of no greater than 30%.

21. The process of claim 19 wherein water is removed from said first effluent fraction to obtain a concentrated salt solution.

22. The process of claim 19 wherein said molasses is backstrap molasses.

23. The process of claim 19 wherein the molasses having the precipitant removed therefrom is thereafter treated to remove high molecular weight material therefrom prior to passing through the ion exclusion resin, said removal of high molecular weight material comprising passing said molasses through a membrane filter.

24. The process of claim 23 wherein said membrane filter comprises cellulose acetate.

25. The process of claim 19 wherein said third effluent fraction is thereafter decolorized and concentrated.

26. The process of claim 25 wherein said decolorizing comprises passing said third effluent fraction through a bed of activated carbon material and a decolorizing resin.

27. The process of claim 19 wherein said molasses solution has a pH in the range of about 2.0 to about 2.5 upon the addition of ferric ions.

28. The process of claim 27 wherein said pH is about 2.1 to about 2.5.

29. The process of claim 27 wherein said ferric ions are added in the form of a member selected from the group consisting of ferric chloride, ferric sulfate, and mixtures thereof.

30. The process of claim 27 wherein said molasses solution is at a temperature of between about 60° F. to about 120° F. upon the addition of ferric ions.

31. The process of claim 27 wherein ferric ions are removed from the molasses solution after removal of the precipitate therefrom.

32. The process of claim 31 wherein the removal of ferric ions comprises adding a phosphate-containing material to the molasses and thereafter raising the pH of the molasses to above about 7.0.

33. A process according to claim 19 wherein said resin material comprises a sulfonated styrene-divinylbenzene polymerizate having a cross linkage or percent of divinylbenzene of at least 4%.

34. The process of claim 33 wherein the density of the molasses solution passed through said resin is no greater than 60° Brix.

35. The process of claim 33 wherein the size of the individual particles comprising said resin are such that they are retained on a 20 to 50 mesh (U.S. Sieve) screen.

36. The process of claim 33 wherein the size of the individual particles comprising said resin are such that they are retained on a 50–80 mesh (U.S. Sieve) screen.

37. The process of claim 33 wherein the temperature of the water passing through the ion exclusion resin is at least about 20° (° F.) less than the temperature of the molasses solution passed through said resin.

38. The process of claim 37 wherein the temperature of the molasses solution passed through said resin is about 180° F.

* * * * *

UNITED STATES PATENT AND TRADEMARK OFFICE
CERTIFICATE OF CORRECTION

PATENT NO. : 4,101,338
DATED : July 18, 1978
INVENTOR(S) : Robert M. Rapaport et al.

It is certified that error appears in the above-identified patent and that said Letters Patent are hereby corrected as shown below:

Column 4, line 16, correct spelling of "successfully".

Column 10, line 12, change "U.s. to -- U. S. --.

Column 17, Example XVIII, line 23, correct spelling of "diameter".

Column 20, Claim 16, line 2, correct spelling of "carbohydrate".

Column 20, Claim 22, line 31, correct spelling of "blackstrap".

Signed and Sealed this

Seventeenth Day of April 1979

[SEAL]

Attest:

RUTH C. MASON
Attesting Officer

DONALD W. BANNER
Commissioner of Patents and Trademarks